United States Patent
Miyoshi

(10) Patent No.: US 8,643,732 B2
(45) Date of Patent: Feb. 4, 2014

(54) IMAGE BLUR COMPENSATION DEVICE AND IMAGING APPARATUS

(75) Inventor: Kaori Miyoshi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/419,957

(22) Filed: Mar. 14, 2012

(65) Prior Publication Data

US 2012/0249814 A1 Oct. 4, 2012

(30) Foreign Application Priority Data

Mar. 28, 2011 (JP) ................................ 2011-069918

(51) Int. Cl.
*H04N 5/228* (2006.01)

(52) U.S. Cl.
USPC ..................................................... 348/208.7

(58) Field of Classification Search
USPC ................. 348/208.99, 208.1–208.7, 208.12, 348/208.13, 373–374, 219.1; 396/55
See application file for complete search history.

(56) References Cited

U.S. PATENT DOCUMENTS

| | | | |
|---|---|---|---|
| 7,639,933 B2 * | 12/2009 | Seo et al. | 396/55 |
| 2010/0157074 A1 * | 6/2010 | Kawai et al. | 348/208.7 |
| 2011/0050921 A1 * | 3/2011 | Noto | 348/208.7 |
| 2012/0038784 A1 * | 2/2012 | Irisawa et al. | 348/208.7 |

FOREIGN PATENT DOCUMENTS

| | | | |
|---|---|---|---|
| JP | 06-030327 | | 2/1994 |
| JP | 2008065163 A | * | 3/2008 |
| JP | 2010-128386 | | 6/2010 |

* cited by examiner

*Primary Examiner* — Tuan Ho
*Assistant Examiner* — Zhenzhen Wu
(74) *Attorney, Agent, or Firm* — Cowan, Liebowitz & Latman, P.C.

(57) ABSTRACT

An image blur compensation device detects the shake of an apparatus and compensates image blur by means of a mechanism for rotating an image sensor about an axis perpendicular to the imaging plane of the image sensor. A rotary member for holding the image sensor is rotatably held by a base member. The rotary member and the base member are urged by a tension spring in a direction closer to each other, and a ball provided between the rotary member and the base member rotatably supports the rotary member in a state where the ball abuts against both the rotary member and the base member. The ball is arranged within a ball-receiving groove formed in the base member. The ball is brought into abutment against the abutment surface provided on the rotary member by an urging force of a tension spring.

9 Claims, 5 Drawing Sheets

(A)

(A)

IMAGE BLUR COMPENSATION DEVICE AND IMAGING APPARATUS

BACKGROUND OF THE INVENTION

1. Field of the Invention

The present invention relates to an image blur compensation technology that optically compensates image blur caused by an unintentional movement of hands.

2. Description of the Related Art

Conventionally, an image blur compensation device including a mechanism that moves some lenses (compensation lens) included in an imaging optical system or an image sensor in order to compensate image blur caused by an unintentional movement of hands during hand-held shooting is known. Image blur elimination control is performed by moving the compensation lens or the image sensor in a first direction and a second direction orthogonal to the first direction in a plane perpendicular to the optical axis of the imaging optical system.

Japanese Patent Laid-Open No. 06-030327 discloses a device including a rotary mechanism which detects the inclination of a camera with the optical axis of the camera being as the rotation axis using an inclination sensor to thereby rotate an image sensor. In this configuration, the image sensor is held and rotated by the relationship between a shaft and a shaft receiving hole (see a bearing 22 shown in Example disclosed in Japanese Patent Laid-Open No. 06-030327). With the aid of the rattling generated by the fitting between the axis and the shaft receiving hole, a rotary member for supporting the image sensor moves to a case in a direction orthogonal to the optical axis. Thus, the shake compensation device disclosed in Japanese Patent Laid-Open No. 2010-128386 includes a first rotation drive unit 180 and a second rotation drive unit 190 with respect to a rotation frame unit 120 serving as a rotary member. In this configuration, the direction of a first rotational force RF1 exerted by the first rotation drive unit 180 is controlled so as to be different from the direction of a second rotational force RF2 exerted by the second rotation drive unit 190, and thus, the clearance of the bearing is eliminated by the resultant force of rotational forces in the directions.

In the conventional configuration, when the image sensor is rotated, it is difficult to minimize image blur by suppressing the displacement of the rotation center of the image sensor. In the configuration disclosed in Japanese Patent Laid-Open No. 2010-128386, the second rotational force for rotating the image sensor is disturbed by the first rotational force. In other words, a drive unit having the second rotational force enough to conquer the decrease in the rotational force caused by the first rotational force is required, resulting in an increase in size and power consumption of an apparatus.

SUMMARY OF THE INVENTION

Accordingly, the present invention suppresses image blur caused by the displacement of the rotation center of the image sensor upon rotation of the image sensor without involving an increase in size of an apparatus in a simple configuration.

According to an aspect of the present invention, an image blur compensation device is provided that includes a rotary member that holds an image sensor; a base member that rotatably holds the rotary member about an axis perpendicular to an imaging plane, wherein the rotary member or the base member comprises an abutment surface; an urging member that urges the rotary member and the base member in a direction closer to each other, wherein the abutment surface and a support member are brought into abutment by an urging force of the urging member; the support member that rotatably supports the rotary member with respect to the base member in a state where the support member is brought into abutment against the rotary member and the base member; and a drive unit that drives the rotary member.

According to another aspect of the present invention, an imaging apparatus is provided that includes an image blur compensation device includes a rotary member that holds an image sensor; a base member that rotatably holds the rotary member about an axis perpendicular to an imaging plane, wherein the rotary member or the base member has an abutment surface; an urging member that urges the rotary member and the base member in a direction closer to each other, the abutment surface and a support member are brought into abutment by an urging force of the urging member; the support member that rotatably supports the rotary member with respect to the base member in a state where the support member is brought into abutment against the rotary member and the base member; and a drive unit that drives the rotary member and a driving control unit that controls the drive unit of the image blur compensation device.

According to the present invention, an image blur caused by the displacement of the rotation center of the image sensor may be suppressed upon rotation of the image sensor without involving an increase in size of an apparatus in a simple configuration.

Further features of the present invention will become apparent from the following description of exemplary embodiments with reference to the attached drawings.

DESCRIPTION OF THE EMBODIMENTS

Hereinafter, preferred embodiments of the present invention will be described with reference to the attached drawings.

Figure 1:
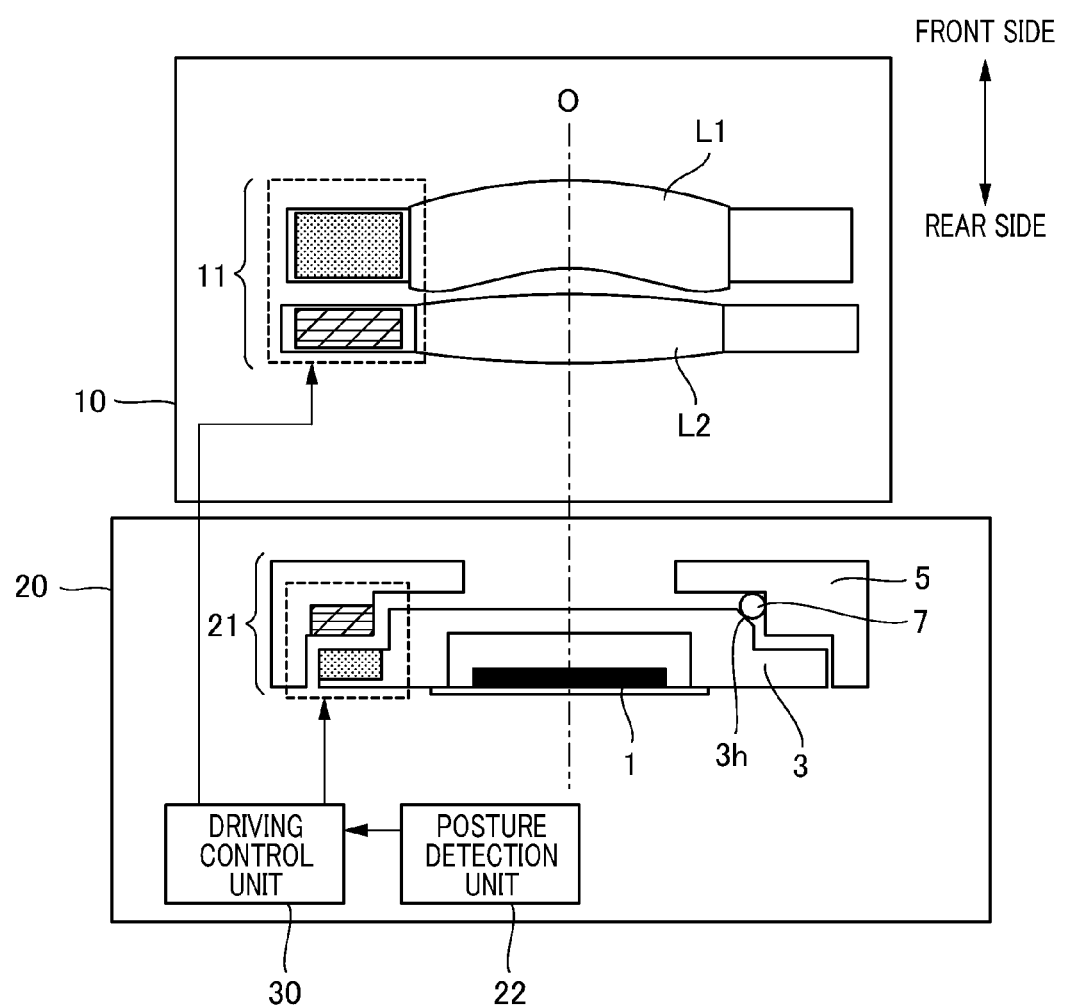
FIG. 1 is a schematic view illustrating an essential part of an imaging apparatus using an image blur compensation device according to an embodiment of the present invention.
Figure 2:
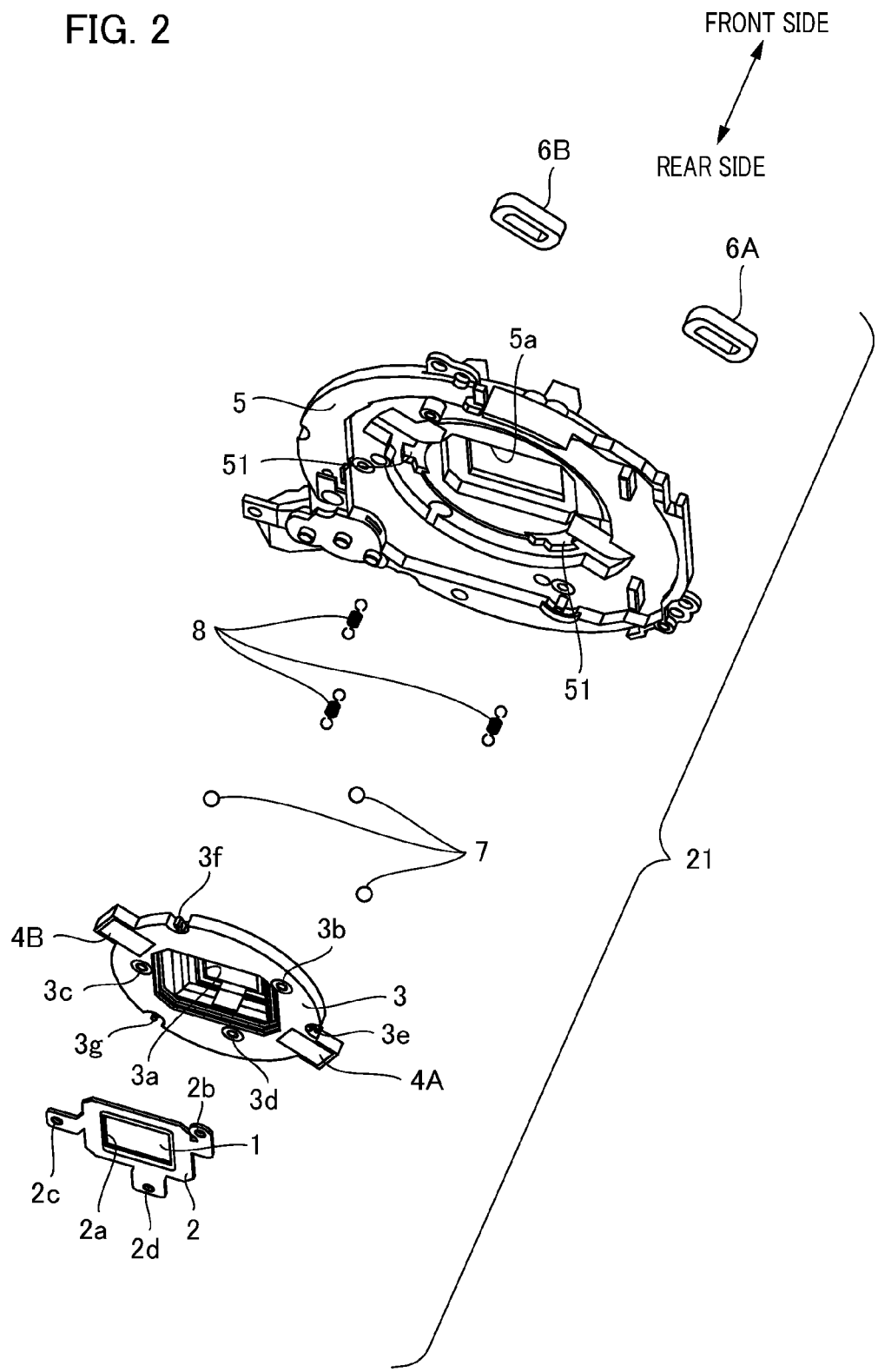
FIG. 2 is an exploded perspective view illustrating a second compensation unit 21 shown in FIG. 1.

FIG. 1 is a schematic view illustrating an essential part of an imaging apparatus using an image blur compensation device according to the present embodiment. The image blur compensation device is a device that compensates image blur generated by the shake of the apparatus case. Hereinafter, a description will be given taking an example in which a digital still camera having a lens barrel 10 and a camera body 20 is used as an imaging apparatus.

The lens barrel 10 includes a first compensation unit 11. The first compensation unit 11 has a compensation lens L1 and a fixed lens L2, and performs the linear shifting movement of the compensation lens L1 in a plane perpendicular to the optical axis (see the axis "O" in FIG. 1) of the imaging apparatus. With this arrangement, image blur is compensated in the shift (linear) direction. Note that the lens barrel 10 includes the compensation lens L1, the fixed lens L2, and a lens group (not shown) forming an imaging optical system together with these lenses. However, the illustration and description thereof will be omitted.

The camera body 20 includes a second compensation unit 21 and a driving control unit 30. The second compensation unit 21 has a rotary member 3 for fixing an image sensor 1 and a base member 5, and performs compensation for direction of rotation relating to image blur by controlling the drive of the rotary member 3 about an optical axis O. The details of the second compensation unit 21 will be described below. The driving control unit 30 acquires a detection signal from a posture detection unit 22, and drives/controls the shifting movement of the compensation lens L1 and the rotation of the rotary member 3 in order to suppress image blur. Note that the posture detection unit 22 has a sensor for detecting the posture of the camera body 20, and detects the posture of the apparatus in a well-known method.

The image blur compensation device of the present embodiment rotates the image sensor 1 about the optical axis O in a plane perpendicular to the optical axis O to thereby compensate image blur generated by the shake in the direction of rotation about the axis parallel to the optical axis O, such as an unintentional movement of hands or the like.

A detailed description will be given of the image blur compensation device of the present embodiment with reference to FIGS. 2 to 6. In the following description, an object side is referred to as a front side or forward and its other side is referred to as a rear side or rearward based on the device.

The second compensation unit 21 includes a fixation plate 2 for an image sensor 1, a rotary member 3, magnets 4A and 4B, a base member 5, and coils 6A and 6B.

The image sensor 1 is a photoelectric conversion element that images an object via an imaging optical system using the lens barrel 10 and converts the image into an electrical signal. As the image sensor 1, a CCD (Charge Coupled Device) type image sensor, a CMOS (Complementary Metal Oxide Semiconductor) type image sensor, or the like may be used. The fixation plate 2 is a sheet metal for fixing the image sensor 1, and has a holding section 2a for the image sensor 1, and attachment sections 2b, 2c, and 2d for the rotary member 3.

The rotary member 3 is a member that rotates with respect to the base member 5 to be described below and has an opening 3a (see FIG. 4) that permits the passage of light received from the imaging optical system. The rotary member 3 is provided with arrangement space for receiving the fixation plate 2 holding the image sensor 1. The attachment sections 2b, 2c, and 2d of the fixation plate 2 are fixed with the fastening screws at the portions 3b, 3c, and 3d of the rotary member 3, which correspond to the attachment sections 2b, 2c, and 2d. The rotary member 3 is provided with the magnets 4A and 4B fixed at the opposite sides of the center axis. Three hook portions 3e, 3f, and 3g for locking tension springs 8 to be described below are provided at the peripheral edge of the rotary member 3 such that the hook portions 3e, 3f, and 3g are positioned angularly at 120 degrees to each other around the center axis. Three protrusions facing frontward are provided on the front side of the rotary member 3 and three abutment surfaces 3h, 3i, and 3j (see FIG. 4) are formed on three protrusions. These abutment surfaces 3h, 3i, and 3j are the contact surfaces against three balls 7 to be described below. Each of the abutment surfaces 3h, 3i, and 3j is a portion of conical sides having an apex on an axis (the optical axis in this example) perpendicular to the imaging surface. However, the abutment surface is not limited to a portion of conical sides as long as the abutment surface is formed so as not to cause any malfunction upon contact with the ball 7 to be described below.

The base member 5 is a member that is fixed to the camera body 20 with the lens barrel 10 mounted onto the base member 5. An opening 5a is formed on the center of the base member 5 so as not to block light of an object image and three ball-receiving grooves 51 for housing the balls 7 are provided angularly at 120 degrees to each other around the base member 5. Three hook portions 5g, 5h, and 5i (see FIG. 5A) for locking tension springs 8 to be described below are provided as spring catch at positions corresponding to the hook portions 3e, 3f, and 3g of the rotary member 3.

Figure 5B:
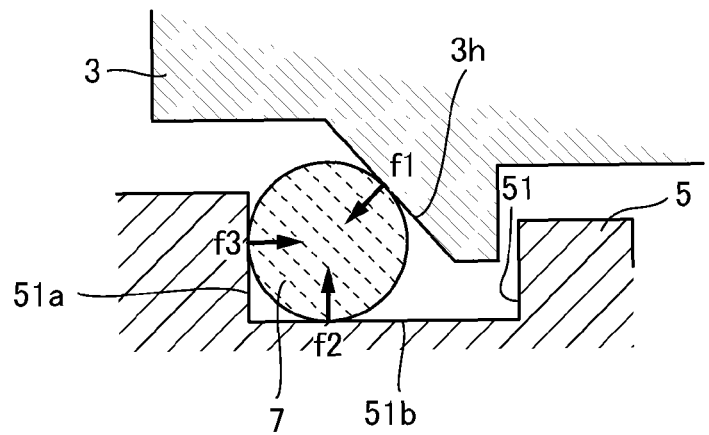
FIG. 5B is a view illustrating the relationship among the rotary member 3, the base member 5, and a ball 7 in a cross-section along the line A-A of the base member 5 shown in FIG. 2.
Figure 6:
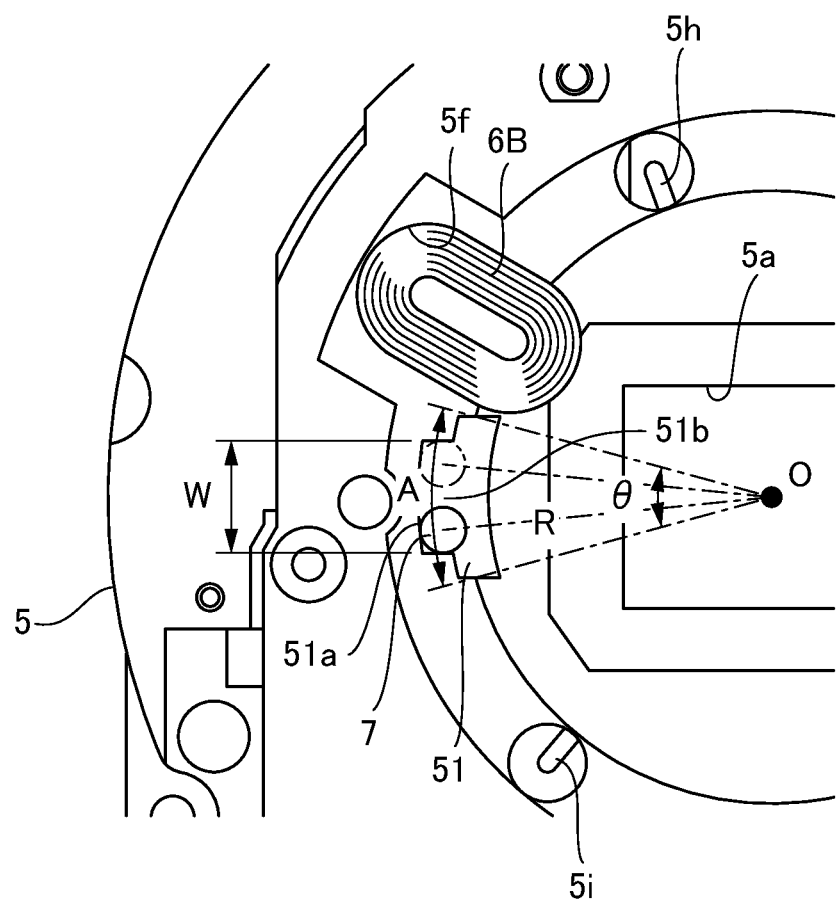
FIG. 6 is a detailed view illustrating the base member 5 shown in FIGS. 5A and 5B.

The ball 7 is a support member that rotatably supports the rotary member 3 to the base member 5. The ball 7 is a spherical component to be used in a state in which the ball 7 is brought into abutment against the rotary member 3 and the base member 5, and is formed of a nonmagnetic material such as ceramic or the like. As shown in FIG. 5B and FIG. 6, the ball-receiving groove 51 has a radial regulation wall 51a and a thrust regulation wall 51b. The radial regulation wall 51a is a first regulation wall that regulates the position of the ball 7 in a radial direction about the optical axis O. Also, the thrust regulation wall 51b is a second regulation wall that regulates the position of the ball 7 in a direction parallel to the optical axis O. Furthermore, as shown in FIG. 6, the width (hereinafter simply referred to as "W") of the ball-receiving groove 51 in a peripheral direction about the optical axis O has the following relationship. When the position of a radius R about the optical axis O is the abutment position of the ball 7, the movable width (the width in the direction of rotation) of the image sensor 1 and the rotary member 3 at the position is A, and the outer diameter (diameter) of the ball 7 is D, the reference symbol "W" satisfies the following inequality:

$$W \geq (1/2) \times A + D \qquad \text{(Formula 1)}$$

A detailed description of the above formula will be given below.

Figure 5A:
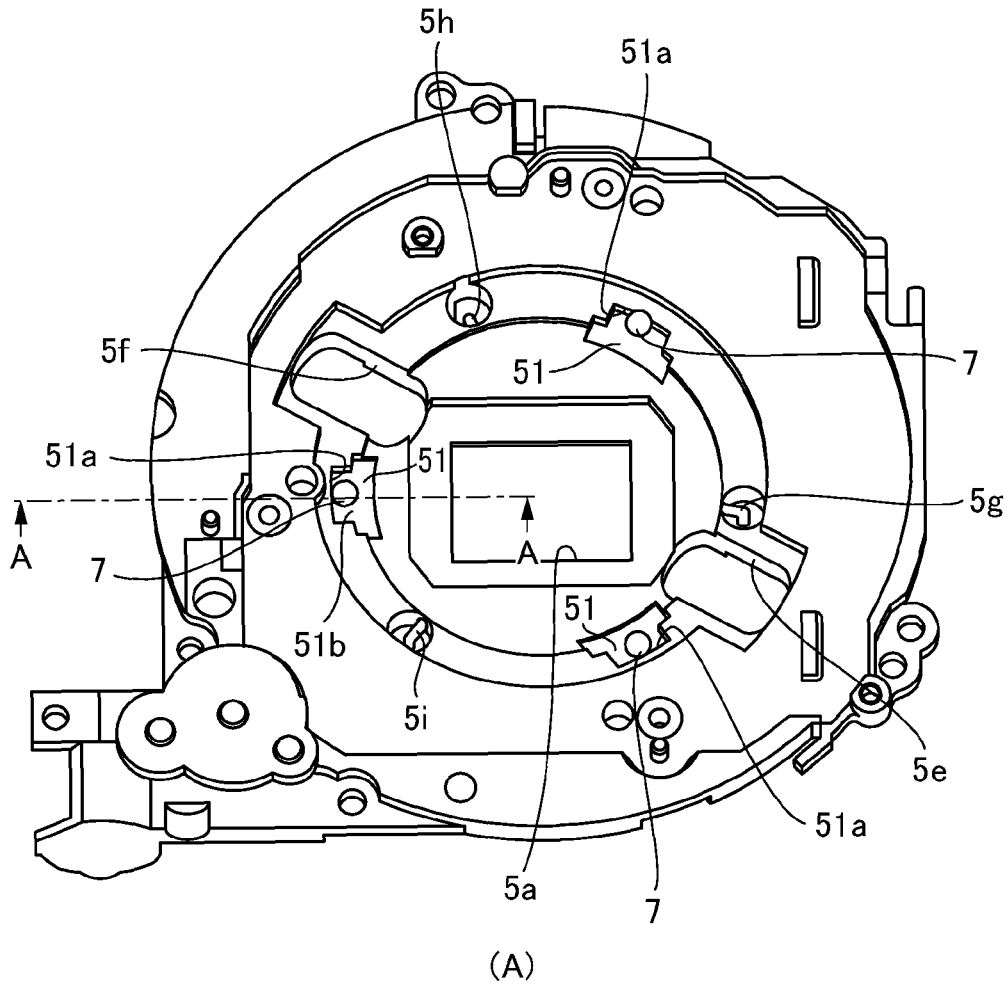
FIG. 5A is a perspective view illustrating a base member 5 shown in FIG. 2 as viewed from the rear side thereof.

The base member 5 shown in FIG. 5A is provided with openings 5e and 5f for attachment of the coils 6A and 6B. The openings 5e and 5f are positioned opposite to one another about the opening 5a, and the coils 6A and 6B, which are copper wires wound on a bobbin, are fixed thereto such that the coils 6A and 6B are oppositely disposed at predetermined intervals against the magnets 4A and 4B described above.

A tension spring 8 serving as an urging member urges the rotary member 3 and the base member 5 in a direction closer to each other. In the present embodiment, three tension springs 8 are used to bridge between the hook portions 3e and 5g, between the hook portions 3f and 5h, and between the hook portions 3g and 5i, respectively.

The detailed description of the mechanism for driving the rotary member 3 of the present embodiment will be omitted. A magnetic force is generated by flowing electric current from the driving control unit 30 to the coils 6A and 6B, and thus, the magnets 4A and 4B facing the coils 6A and 6B are moved by the magnetic force, whereby the rotary member 3 is driven. In the example, the coils 6A and 6B and the magnets 4A and 4B are provided, and two drive units, i.e., a first drive unit consisting of the magnet 4A and the coil 6A and a second drive unit consisting of the magnet 4B and the coil 6B, are used. The first drive unit and the second drive unit are symmetrically provided about the optical axis O. Note that the present invention is not limited thereto and the number of drive units, the arrangement thereof, or the like may be variable depending on the specification.

Figure 3:
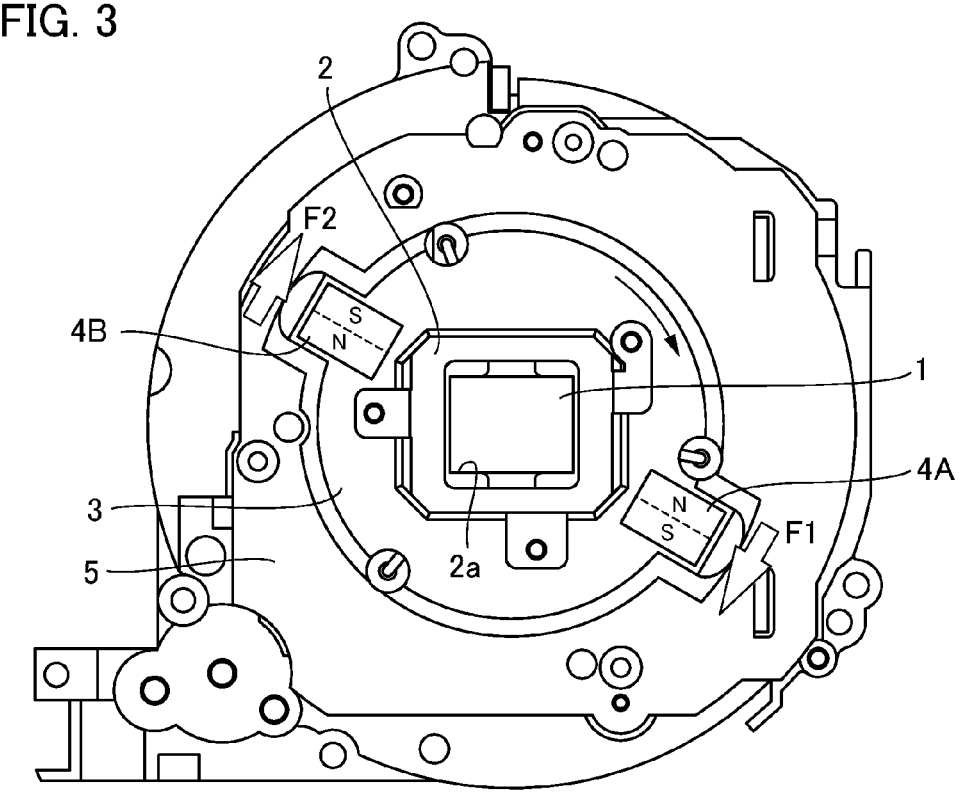
FIG. 3 is a view illustrating the second compensation unit 21 shown in FIG. 1 as viewed from the rear side thereof.
Figure 4:
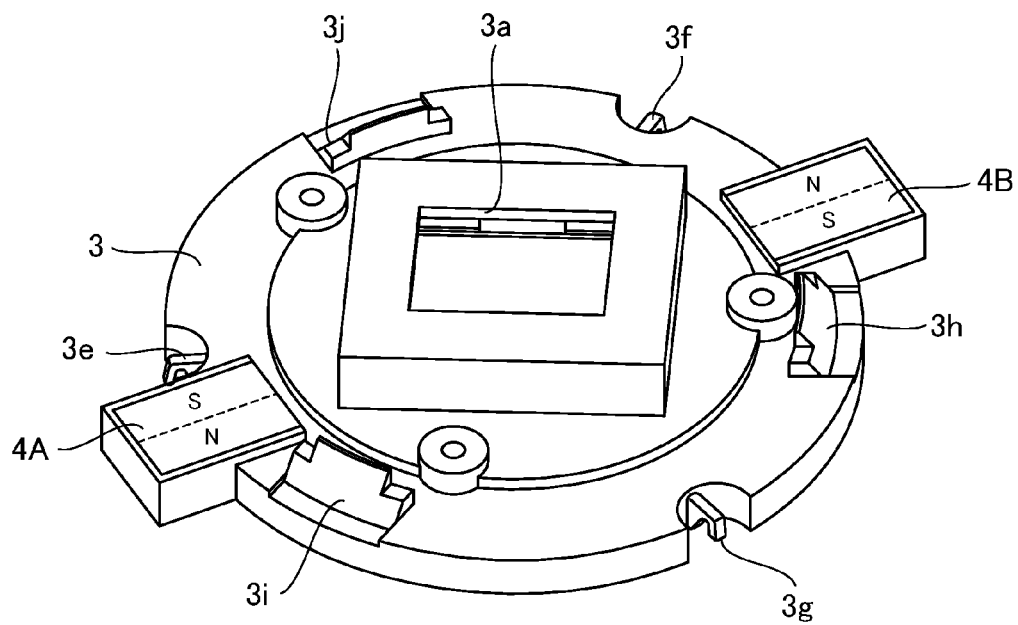
FIG. 4 is a perspective view illustrating a rotary member 3 shown in FIG. 2 as viewed from the front side thereof.

The driving control of the image sensor 1 and the rotary member 3 is performed by generating Lorentz force to the first and the second drive units. For example, when the image sensor 1 is rotated in the clockwise direction as shown in FIG. 3, the driving control unit 30 controls the first drive unit and the second drive unit such that the force exerted by the first drive unit acts in the F1 direction and the force exerted by the second drive unit acts in the F2 direction. The direction of the force is in the direction orthogonal to the segment which extends between the drive units and the rotation center of the rotary member 3. When the image sensor 1 and the rotary member 3 are desired to be driven in the counter-clockwise direction in FIG. 3, the driving control unit 30 controls the drive units such that the driving force exerted by the drive units acts in the opposite direction.

FIG. 5B is a view illustrating the relationship among the rotary member 3, the base member 5, and the ball 7 in a cross-section along the line A-A of the base member 5 shown in FIG. 5A. Upon assembly, a worker inserts the ball 7 into each of the ball-receiving grooves 51 formed in the base member 5, and installs the rotary member 3 so as to sandwich the ball 7 between the regulation walls 51a and 51b and the abutment surface (see 3h in FIG. 5B). Furthermore, an installation operation for urging members (three tension springs 8) is performed so as to press the base member 5 against the rotary member 3. The ball 7 is brought into abutment against the abutment surface 3h, and the pressing force in the f1 direction is generated by the urging force of the tension spring 8. The force in the f2 direction represents a resistive force with respect to the force of pressing the ball 7 against the thrust regulation wall 51b, and the force in the f3 direction represents a resistive force with respect to the force of pressing the ball 7 against the radial regulation wall 51a. The radial regulation wall 51a is a portion of the cylindrical surface about the optical axis O serving as the rotation center. As shown in FIG. 6, the rotary member 3 is rotatable about the optical axis O while maintaining the radius R of the ball 7.

With this configuration, the rotary member 3 is rotatably supported with respect to the base member 5 by the rolling of the ball 7, and the rotary member 3 and the base member 5 are held without any rattling. Thus, the image sensor 1 and the rotary member 3 are smoothly rotatable during driving. Also, the ball-receiving groove 51 having the radial regulation wall 51a and the thrust regulation wall 51b is formed in the base member 5, and thus, the ball 7 surely waits in the ball-receiving groove 51 upon assembly, which may prevents assembly without sandwiching the ball 7 between the rotary member 3 and the base member 5. Furthermore, a portion of a part forming each of the abutment surfaces 3h, 3i, and 3j of the rotary member 3 is inserted into the ball-receiving groove 51 so as to sandwich the ball 7 between the regulation walls 51a and 51b. Thus, even when some force is applied to the ball 7 in a direction for separating the rotary member 3 from the base member 5 due to unexpected impact force or the like, the ball 7 may be prevented from escaping from the ball-receiving groove 51.

The width W of the ball-receiving groove 51 is defined so as to satisfy Formula 1. As shown in FIG. 6, the movable width A of the rotary member 3 is calculated by the angle θ through which the image sensor 1 and the rotary member 3 are rotatable and the rotation radius R (A=R×θ). The width W of the ball-receiving groove 51 is set to a value or greater in which the half of A is added to the diameter D of the ball 7. As shown in FIG. 5B, the rotary member 3 is held by sandwiching the ball 7 together with the base member 5 so at to be relatively rotatable by rolling friction. When the ball 7 collides against the wall surface of the previously non-contact ball-receiving groove 51 during rotating of the image sensor 1 and the rotary member 3, it becomes difficult to roll the ball 7, resulting in abrupt changes in the contact resistance before and after the ball 7 collided against the wall surface. This may prevent stable driving and exert adverse effect on the smooth movement of the rotary member 3. Thus, the width W of the ball-receiving groove 51 needs to have a sufficient dimension such that the ball 7 does not collide against the wall surface within the movable range of the image sensor 1 even when the ball 7 is rolled over. The conditional formula therefor is Formula 1 to thereby define the lower limit of the value W. The upper limit of the value W is defined by other conditions depending on the positional relationship between other members, the design and the specification thereof, or the like.

In the imaging apparatus, the posture detection unit 22 detects the posture of the camera body 20, and outputs the posture detection signal to the driving control unit 30. The driving control unit 30 drives/controls the compensation lens L1 and the rotary member 3 so as to suppress image blur caused by the changes in the posture. During driving/controlling of the image sensor 1 and the rotary member 3, the posture detection unit 22 detects the posture of the camera body 20 in the direction of rotation with respect to the axis parallel to the optical axis O. The driving control unit 30 controls the first and the second drive units in order to compensate image blur caused by changes in the direction of rotation.

According to the present embodiment, each of the abutment surfaces (3h, 3i, and 3j), which is a portion of conical sides, is brought into abutment against the ball 7 by the force of the urging member (the tension spring 8), so that rattling in the direction of the optical axis of the rotary member 3 with respect to the base member 5 and rattling in the direction orthogonal to the optical axis may be eliminated. Thus, the unintentional displacement of the rotary member 3 due to rattling or the like may be prevented so as not to affect the compensation of image blur.

Variant Embodiments

The present invention is not limited to the preferred embodiment described above and various changes and modifications are possible to be included within the technical scope of the present invention.

(1) In the embodiment, a description has been given based on the assumption that the image sensor only moves in the direction of rotation and the movement of the image sensor in the linear direction is performed by the compensation lens L1. The present invention is not limited thereto, and the base member 5 itself having the ball-receiving groove 51 may be a member that is movable in the linear shift direction and image blur may be compensated by the rotation of the image sensor 1 and the movement in the shift direction thereof.

(2) In contrast to the embodiment, each of the abutment surfaces (3h, 3i, and 3j) and the groove portion (the ball-receiving groove 51) may also be configured in the reversed relationship. In other words, the abutment surface provided on the base member 5 is a portion of conical sides having an apex on an axis perpendicular to the imaging plane and the groove portion having the first and the second regulation walls is provided on the rotary member 3.

(3) In the embodiment, a description has been given taking an example of an electromagnetic mechanism in which the coils 6A and 6B are provided on the base member 5 and the magnets 4A and 4B are provided on the rotary member 3. However, the present invention is not limited thereto but the positional relationship between the magnets and the coils may be reversed. In other words, an electromagnetic mechanism in which the magnets are provided on the base member 5 and the coils are provided on the rotary member 3 may also be used.

(4) In the embodiment, a description has been given based on the assumption that the rotation center of the image sensor and the rotary member 3 matches the optical axis O. The center position thereof is not limited thereto but may be set at another position as required.

(5) In the embodiment, the rotary member 3 is supported against the base member 5 by the ball 7 (the mobile member) serving as the support member. However, the ball 7 needs not be rollable as long as the rotary member 3 is supported against the base member 5 in a point contact manner. For example, the ball 7 may be fixed on a part of the base member 5 such that the rotary member 3 slides on the spherical of the ball 7 or the ball 7 may be formed in a spindle shape instead of a spherical shape. In short, the support member may be formed in any shape as long as the support member may be abutted against the abutment surface forming a portion of conical sides without any rattling.

Note that the present invention is not limited to a digital still camera which is mainly used for still-image shooting, but may be widely applied to other types of imaging apparatus such as a film-type camera, a video camera which is mainly used for moving-picture shooting, or the like.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-069918 filed on Mar. 28, 2011 which is hereby incorporated by reference herein in its entirety.

What is claimed is:

1. An image blur compensation device comprising:
a rotary member that holds an image sensor;
a base member that rotatably holds the rotary member about an axis perpendicular to an imaging plane, wherein the rotary member or the base member comprises an abutment surface;
an urging member that urges the rotary member and the base member in a direction closer to each other, wherein the abutment surface and a support member are brought into abutment by an urging force of the urging member;
the support member that rotatably supports the rotary member with respect to the base member in a state where the support member is brought into abutment against the rotary member and the base member; and
a drive unit that drives the rotary member around an optical axis.

2. The device according to claim 1, wherein the support member is in a spherical shape.

3. The device according to claim 2, wherein the member either the rotary member or the base member, which is not having the abutment surface, has a first regulation wall that regulates the movement of the support member in a direction parallel to the imaging plane.

4. The device according to claim 3, wherein the member either the rotary member or the base member, which is not having the abutment surface, has a second regulation wall that regulates the movement of the support member in a direction perpendicular to the imaging plane.

5. The device according to claim 4, wherein the member either the rotary member or the base member, which is not having the abutment surface, has a groove portion having the first regulation wall and the second regulation wall, and the support member located on the groove portion is brought into abutment against the abutment surface and the first regulation wall or the second regulation wall by an urging force of the urging member.

6. The device according to claim 5, wherein the relationship of $W \geq (\frac{1}{2}) \times A + D$ is satisfied, when the width of the groove portion in the direction of rotation of the rotary member is W, the movable width of the rotary member at a position where the rotary member is brought into abutment against the support member is A, and the outer diameter of the support member is D.

7. The device according to claim 5, wherein the abutment surface is a portion of conical sides having an apex on an axis perpendicular to the imaging surface and is brought into abutment against the support member in a state where a portion of the abutment surface is inserted into the groove portion.

8. An imaging apparatus comprising:
an image blur compensation device that comprises:
a rotary member that holds an image sensor;
a base member that rotatably holds the rotary member about an axis perpendicular to an imaging plane, wherein the rotary member or the base member has an abutment surface;
an urging member that urges the rotary member and the base member in a direction closer to each other, the abutment surface and a support member are brought into abutment by an urging force of the urging member;
the support member that rotatably supports the rotary member with respect to the base member in a state where the support member is brought into abutment against the rotary member and the base member; and
a drive unit that drives the rotary member around an optical axis; and
a driving control unit that controls the drive unit of the image blur compensation device.

9. The imaging apparatus according to claim 8, further comprises a posture detection unit that detects the posture of the apparatus,
wherein the driving control unit that acquires a detection signal from the posture detection unit to thereby control the drive unit of the image blur compensation device.

* * * * *